Figure 1:
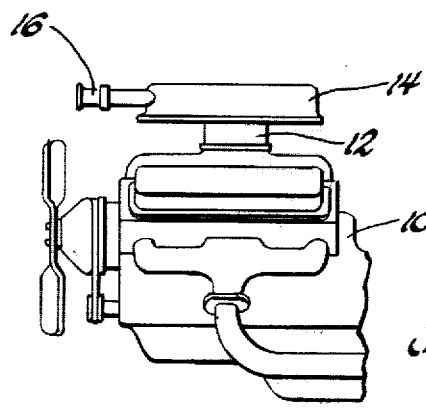

United States Patent [19]

MacManus

[11] 4,332,173
[45] Jun. 1, 1982

[54] FAN TYPE MASS AIRFLOW METER

[75] Inventor: Daniel C. MacManus, Owosso, Mich.

[73] Assignee: General Motors Corporation, Detroit, Mich.

[21] Appl. No.: 157,391

[22] Filed: Jun. 9, 1980

[51] Int. Cl.³ .............................................. G01F 1/78
[52] U.S. Cl. .............................................. 73/861.89
[58] Field of Search ............... 73/861, 861.36, 861.71, 73/861.85, 861.89, 861.79

[56] References Cited

U.S. PATENT DOCUMENTS

| | | | |
|---|---|---|---|
| 2,591,478 | 4/1952 | Turner, Jr. | 73/861.36 |
| 2,614,417 | 10/1952 | Cockrell et al. | 73/862.19 |
| 3,037,383 | 6/1962 | Ziniuk et al. | 73/861.36 |
| 3,044,294 | 7/1962 | Wilhelm | 73/861.36 |
| 3,353,406 | 11/1967 | Moss | 73/861.36 |
| 3,360,989 | 1/1968 | Herrington | 73/861.85 |
| 3,364,741 | 1/1968 | Hickox | |
| 3,440,877 | 4/1969 | Kovats | 73/861.83 |

*Primary Examiner*—Herbert Goldstein
*Attorney, Agent, or Firm*—Warren D. Hill

[57] ABSTRACT

A fan in a duct driven by a permanent magnet D.C. motor powered by a constant voltage source varies in speed according to the airflow through the duct. The current drawn by the motor is a direct function of the air speed and the density. The motor current is measured to provide a measure of mass airflow.

6 Claims, 3 Drawing Figures

FAN TYPE MASS AIRFLOW METER

This invention relates to a mass airflow meter and especially to a motor driven fan type of mass airflow meter.

It is often desired to accurately measure the flow of air, for example, that entering the carburetor of an internal combustion engine. While many types of instruments are known for measuring mass airflow, such instruments ordinarily are very expensive or they are not well equipped to accurately measure mass airflow over a wide temperature range such as the ambient temperatures commonly encountered by a motor vehicle.

It is therefore a general object of the invention to provide an inexpensive mass airflow meter which gives accurate results over a wide temperature range.

It is another object to provide such a meter which introduces only a small pressure drop in the airflow.

The invention is carried out by providing a fan in a duct through which air flows, the fan driven by a permanent magnet motor supplied by a constant voltage source such that the motor current is a measure of the mass airflow in the duct.

Figure 2:
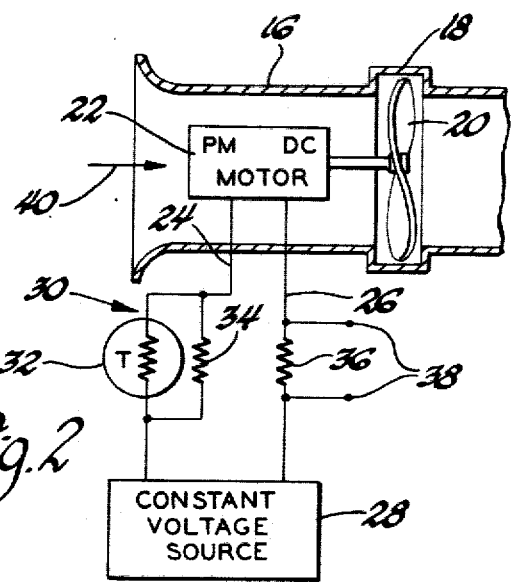
Figure 3:
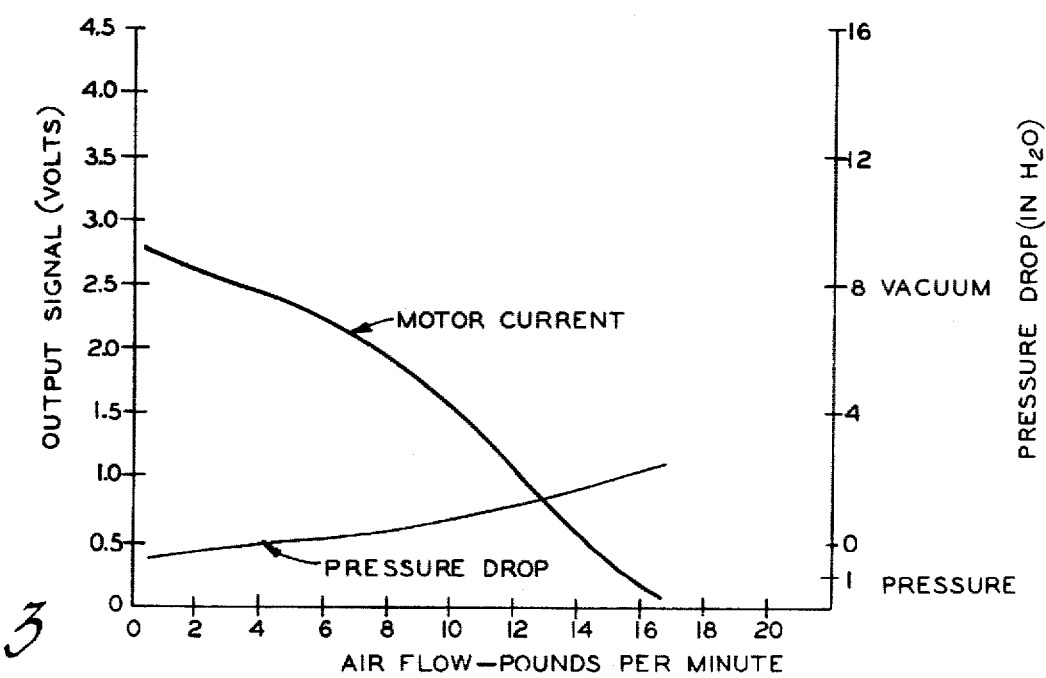

The above and other advantages will be made more apparent from the following specification taken in conjunction with the accompanying drawings wherein like reference numerals refer to like parts and wherein:

FIG. 1 is a schematic view of an automotive engine and carburetor with an air intake duct which incorporates a mass airflow meter according to the invention, FIG. 2 is a schematic view of the airflow meter according to the invention including the circuitry therefor, and FIG. 3 is a graph showing the variations in a motor current with mass airflow and pressure drop across the meter versus mass airflow.

Referring to FIG. 1 an engine 10 is equipped with a carburetor 12 having an air cleaner 14 with an air intake duct 16. The duct 16 as shown in detail in FIG. 2 has a circular cross-section of uniform diameter except for a short section 18 of slightly enlarged diameter. A fan 20 is located in the duct in the section 18 and is drivingly connected to a permanent magnet D.C. motor 22. The motor is connected by lines 24 and 26 to a constant voltage source 28. A temperature compensation network 30 comprising a thermistor 32 and a parallel resistor 34 is incorporated in the line 24. The line 26 includes a small resistor 36 and output lines 38 are connected at opposite ends of the resistor 36 for picking up a voltage proportional to the motor current flow through the resistor 36.

In operation airflow normally occurs through the duct 16 in the direction shown by the arrow 40. The fan 20 can be rotated in a direction to buck or aid the normal airflow. It is preferred that the fan aid the airflow to the engine. In the case of zero airflow, the motor 22 driving the fan 20 draws a current dependent upon the air speed, air density, the fan efficiency and the motor characteristics. As airflow through the engine increases, less torque or power is required to drive the fan 20 and the motor current decreases substantially linearly with the increase of the mass airflow. Thus, the voltage produced across the lines 38 is a measure of the mass airflow.

To provide a measure of the full airflow through the duct, the meter is designed to limit the slippage of air past the fan 20. The enlarged short section 18 of the duct allows an abrupt change in cross-section and further allows the fan to be slightly larger in diameter than the main body of the duct. In addition, the diameter of the fan 20 differs from the inner diameter of the section 18 by only a small clearance. Thus the airflow through the duct does not readily circumvent the fan.

Temperature effects on the motor 22 tend to change the resistance of the copper motor winding therefore introducing a temperature error in the current-airflow relationship. The temperature compensation network 30 therefore is incorporated in the motor power supply circuit to maintain a constant circuit resistance over the temperature range encountered in a motor vehicle environment. The compensation circuit 30 is physically incorporated in the duct and therefore, like the motor 22, is subject to the temperature variations of the airstream. The copper motor windings have a positive temperature coefficient and the temperature compensation network has a corresponding negative temperature coefficient.

As a specific example of a mass airflow meter, the motor comprises a six volt permanent magnet D.C. motor connected to a six volt regulated source 28. The resistor 36 has a value of five ohms, the thermistor 32 has a value of 200 ohms at 20° C. and the resistor 34 has a value of eight ohms. The combined resistance of the compensation network 30 has a temperature coefficient of $-0.00395$ ohms per ohm per degree centigrade. The duct 16 is 3 inches in diameter and the section 18 has a diameter of $3\frac{1}{4}$ inches. The fan 20 has two blades with a diameter of approximately $3\frac{1}{8}$ inch. This specific embodiment of the invention produces a motor current characteristic as shown in the graph of FIG. 3 wherein the output signal on lines 38 is plotted against airflow in pounds per minute. It is seen that the motor current curve is substantially linear increasing from a maximum value at zero airflow to a nearly zero value at a maximum airflow. It should be noted that as a matter of design, the motor characteristics and the fan blade design must be selected with the maximum airflow in mind so that the motor current does not attain a zero value at airflows below the maximum value of mass airflow to be measured. The linearity required for the motor current curve depends upon the usage to which the output is being adopted. It is possible to design the fan and/or the duct to make the motor current curve as nearly linear as desired.

The pressure drop curve in FIG. 3 reveals that the airflow meter according to this invention does not impose a large pressure drop penalty on the air intake system of the engine. In fact, the fan tends to assist the airflow toward the engine so that at airflows below about five pounds per minute there is actually a pressure increase across the meter rather than a pressure drop. At higher airflows the pressure drop remains small.

It will thus be seen that the mass airflow meter according to the invention is an inexpensive means for accurately measuring the mass airflow and is useful over a wide range of temperatures, compensation being necessary only for the effects of air temperature on the motor itself.

The embodiments of the invention in which an exclusive property or privilege is claimed are defined as follows:

1. A mass airflow meter for measuring the mass airflow through a duct comprising
   a fan in the duct, a permanent magnet D.C. motor coupled to the fan for driving the fan, supply means for supplying a substantially constant voltage to the motor for operation of the motor at a speed depending on the mass airflow, wherein the motor current varies substantially inversely with fan speed, and current sensing means connected to the supply means for providing an output signal proportional to the motor current to provide a substantially linear measure of mass airflow.

2. A mass airflow meter for measuring the mass airflow through a duct comprising a fan in the duct, a permanent magnet D.C. motor coupled to the fan for driving the fan in a direction to aid the airflow through the duct, supply means for supplying a substantially constant voltage to the motor for operation of the motor at a speed which increases with increased mass airflow, wherein the motor current varies substantially inversely with fan speed, and current sensing means connected to the supply means for providing an output signal varying substantially in inverse proportion to mass airflow.

3. A mass airflow meter for measuring the mass airflow through a duct comprising a fan in the duct, means for inhibiting airflow around the fan so that substantially all the airflow passes through the fan, a permanent magnet D.C. motor coupled to the fan for driving the fan in direction to aid the flow of air through the duct, supply means for supplying a substantially constant voltage to the motor for operation of the motor at a speed which increases linearly with increased mass airflow, wherein the motor current varies substantially inversely with fan speed, and current sensing means connected to the supply means for providing an output signal proportional to the motor current to provide a substantially linear measure of mass airflow.

4. A mass airflow meter for measuring the mass airflow through a duct comprising a fan in the duct, a permanent magnet D.C. motor coupled to the fan for driving the fan, supply means for supplying a substantially constant voltage to the motor for operation of the motor at a speed depending on the mass airflow, the supply means including a temperature responsive circuit for compensating for temperature effects on the motor wherein the motor current varies substantially inversely with fan speed independently of temperature, and current sensing means connected to the supply means for providing an output signal varying in proportion to the motor current to provide a substantially linear measure of mass airflow.

5. A mass airflow meter for measuring the mass airflow through a duct comprising a fan in the duct, the airflow through the duct acting on the fan to vary the torque on the fan as a function of mass airflow, an electric motor coupled to the fan for driving the fan, said motor having a speed-current characteristic such that current varies substantially inversely with fan speed, supply means for supplying a substantially constant energizing voltage to the motor, the varying fan torque operative to vary the speed of the energized motor as a function of mass airflow, and current sensing means connected to the supply means for providing an output signal proportional to the motor current to provide a substantially linear measure of mass airflow.

6. A mass airflow meter for measuring the mass airflow through a duct comprising a fan in the duct, the airflow through the duct acting on the fan to vary the torque on the fan as a function of mass airflow, an electric motor coupled to the fan for driving the fan, said motor having a speed-current characteristic such that current varies substantially inversely with fan speed, supply means for supplying a substantially constant energizing voltage to the motor, the varying fan torque operative to vary the speed of the enlarged motor as a function of mass airflow, the supply means including a temperature responsive circuit for compensating for temperature effects on the motor wherein the motor current varies substantially inversely with fan speed independently of temperature, and current sensing means connected to the supply means for providing an output signal proportional to the motor current to provide a substantially linear measure of mass airflow.

* * * * *